United States Patent [19]

Wooten et al.

[11] 4,401,804
[45] Aug. 30, 1983

[54] DEACTIVATION OF POLYESTER CATALYST RESIDUES

[75] Inventors: Willis C. Wooten; Joseph S. Zannucci, both of Kingsport, Tenn.

[73] Assignee: Eastman Kodak Company, Rochester, N.Y.

[21] Appl. No.: 381,128

[22] Filed: May 24, 1982

[51] Int. Cl.$^3$ ............................................. C08G 63/70
[52] U.S. Cl. .................................. 528/272; 528/480; 528/487
[58] Field of Search ...................... 528/272, 480, 487

[56] References Cited

U.S. PATENT DOCUMENTS 3,404,121  10/1968  Barkey ................................. 528/487
3,816,377  6/1974   Okuzumi .............................. 528/487
4,328,059  5/1982   Horlbeck et al. ..................... 528/487

Primary Examiner—Lucille M. Phynes
Attorney, Agent, or Firm—Clyde L. Tootle; Daniel B. Reece, III

[57] ABSTRACT

A process is provided for deactivation of catalyst residues in polyester compositions. The polyester compositions are provided by polymerizing diols and diacids, or mixtures of such diols and diacids, to form polyester compositions. The polymerization is carried out in the presence of a polymerization catalyst that leaves traces of such catalyst residues in the polyester composition. These catalyst residues can adversely affect the further processing and end use of the polyester composition. The present process provides deactivation of the catalyst residues by the use of a combination of a mono- or dihydrogen phosphonate or mono-, di-, or trihydrogen phosphate compound and a di- or triester phosphonate compound or a phosphite compound.

8 Claims, No Drawings

DEACTIVATION OF POLYESTER CATALYST RESIDUES

DESCRIPTION

This invention relates to the deactivation of catalyst residues in polyester compositions. In a particular aspect this invention relates to a combination of phosphorus containing compositions useful for deactivating catalyst residues. In a more specific aspect this invention relates to deactivation of catalyst residues in polyester compositions by the use of a combination of a mono- or dihydrogen phosphonate or mono-, di-, or trihydrogen phosphate compound and a di- or triester phosphonate compound or a phosphite compound.

It is well known in the art that in many end use applications it is necessary that the polyester compositions be stabilized against ultraviolet light, heat, or both. Typical commercial stabilizers used for such purposes contain phenolic moieties which can form undesirable complexes with the catalyst residues, such as transition metals, that remain in the polyester composition. Heretofore, phosphorus containing compounds have been used to deactivate the catalyst residues. Such phosphorus containing compounds as phosphoric acid, poly(ethylene hydrogen phosphate), and distearyl pentaerythritol diphosphate have been used but these compounds are not completely effective in deactivation of catalyst residues in polyester compositions. It therefore would be an advance in the state of the art to provide for the improved deactivation of catalyst residues in polyester compositions.

In accordance with this invention, it has been discovered that catalyst deactivation in polyester compositions is substantially improved by the use of a combination of a mono- or dihydrogen phosphonate or mono-, di-, or trihydrogen phosphate compound and a di- and triester phosphonate compound or a phosphite compound.

The polyesters treated in accordance with the process of the invention are the linear polymer products prepared by reacting at least one dicarboxylic acid or derivatives thereof (e.g., esters and anhydrides) with at least one glycol in the presence of a conventional metal condensation catalyst in accordance with processes well known in the art. The polyesters may be prepared by direct esterification of the glycol and dibasic acid or alternatively the polyesters may be prepared by ester interchange. In general, the polyesters of the invention have an inherent viscosity of at least 0.3 (as measured in a 60/40 phenol and tetrachloroethane mixture) and a metal condensation catalyst residue content of at least about 25 or 50 parts per million (p.p.m.) based on the metal.

The metallic catalyst residues which are removed as a result of the treatments described herein are in general residues or compounds of those metals which are well documented in the art as being catalysts for the preparation of polyesters. Typical metal catalysts employed are organic or inorganic compounds of arsenic, cobalt, tin, antimony, zinc, titanium, magnesium, calcium, manganese, gallium, sodium, lithium and the like. Generally, the metal content is reduced to less than about 100 p.p.m. of active metal and preferably to less than about 50 p.p.m. of active metal. By "active metal" is meant a metal which catalyzes either ester interchange or polymer buildup reactions.

The Type 1 monohydrogen or dihydrogen phosphonate or mono-, di-, or trihydrogen phosphate component of the catalyst deactivation system has the formulae:

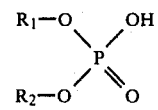
a.

wherein $R_1$ and $R_2$ can be hydrogen or a hydrocarbon containing 1 to 22 carbon atoms. The hydrocarbon can be a linear alkyl group containing 1 to 22 carbon atoms, a branched alkyl group containing 1 to 22 carbon atoms or an aryl group containing 6, 12 or 18 carbon atoms or an alkylenearylene group containing 7 to 22 carbon atoms. Such linear alkyl groups can be methyl, ethyl, propyl, butyl, pentyl, octyl, decyl and the like. Such branched alkyl groups can be isopropyl, isobutyl, 2-ethylheptyl, and the like. Such aryl groups can be phenyl, naphthyl, biphenyl, phenylnaphthyl, and the like. Such alkyl aryl groups can be 3-methylphenyl, 2,4-dimethylphenyl and the like. $R_1$ and $R_2$ can be the same or different.

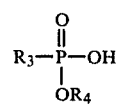
b.

wherein $R_3$ is the same as $R_1$ except that $R_3$ cannot be hydrogen and $R_4$ is the same as $R_1$ and $R_2$. $R_3$ and $R_4$ can be the same or different.

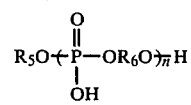
c.

wherein n is 1 to 20 and $R_5$ is the same as $R_1$. $R_6$ can be a linear or branched, substituted or unsubstituted alkyl group containing 2 to 18 carbon atoms, a substituted or unsubstituted aryl group containing 6, 12 or 18 carbon atoms, or an alkylene arylene group containing $C_7$ to $C_{18}$ carbon atoms.

Such Type I phosphorus compounds are, for example, phosphoric acid, didodecylphosphate, monododecyl phosphate, lauryl acid phosphate, distearyl phosphate, poly(ethylene hydrogen phosphate), poly(ethyleneoxyethylene phosphate), benzenephosphonic acid, p-hydroxybenzil phosphonic acid, and 4-hydroxy-3,5-di-t-butylbenzyl ethyl phosphonic acid and the like.

The Type II di- and triester phosphonate or phosphite component of the catalyst deactivation system has the following formulae:

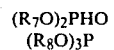
a.
b.

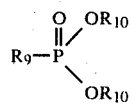
c.

wherein $R_7$ to $R_{11}$ cannot be hydrogen but can otherwise be the same as $R_1$ and $R_2$.

Such di- and triester phosphonate compounds or phosphite compounds are, for example, diisooctyl phosphite, distearyl phosphite, trilauryl phosphite, tris(dipropyleneglycol)phosphite, diphenyl phosphite, phenyl diisodecyl phosphite, distearyl pentaerythritol diphosphite, diisooctyl octylphenyl phosphite, dibutyl benzyl phosphonate, and dioctyl 3,5-di-t-butyl-4-hydroxybenzylphosphonate and the like.

Preferably the ratio of phosphorus to catalyst (P/C) should range from 1 to 10 weight percent depending on the type of catalyst present and the amount of color that is tolerable. The ratio of Type II to Type I (II/I) phosphorus compounds can be 0.5 to 10. The preferred ratio range is 1 to 5. Preferably the amount of Type I component is present in about 0.01 to about 0.5 weight percent and the Type II component is present in an amount of about 0.05 to about 0.75 weight percent. The phosphorus compounds are blended into the polymer by methods well known in the art, e.g., dry blending with polymer pellets followed by extrusion and pelletizing.

The invention can be further illustrated by the following examples of preferred embodiments, although it will be understood that these examples are included merely for purposes of illustration and are not intended to limit the scope of the invention.

EXAMPLE 1

About 99 grams of poly(1,4-cyclohexylenedimethyl terephthalate) polyester pellets containing about 50 p.p.m. titanium and about 76 p.p.m. manganese are blended with about 1 gram 2-hydroxy-5-t-octylphenyl benzotriazole (HOPE), about 0.06 gram phosphoric acid and about 0.1 gram distearyl pentaerythritol, compounded in an extruder at 250° C. and molded into ⅛" plaques. Color measurements were made according to ASTM D2244-79. The sample had a CDM b+ value of 6.7. The CDM b+ value is a measurement of yellowness of the sample due to yellow catalyst/HOPE complex.

EXAMPLE 2

Repeating the procedure of Example 1 except that the phosphoric acid is lowered from 0.06 to 0.05 gram and increasing the distearyl pentaerythritol from 0.1 gram to 0.25 gram provided a CDM b+ value of 6.1.

EXAMPLE 3

Repeating the procedure of Example 1 except that the phosphoric acid and distearyl pentaerythritol were deleted provided a CDM b+ color value of 11.2.

EXAMPLE 4

Repeating the procedure of Example 3 except that the 2-hydroxyl-5-t-octylphenyl benzotriazole is also deleted provided a CDM b+ color value of 6.2. This example shows that the color of the stabilized composition of Example 1 is about the same as the unstabilized control.

EXAMPLE 5

Repeating Example 3 except that 0.1 gram phosphoric acid was added provided a CDM b+ color value of 9.8. This example shows that the phosphoric acid alone did not prevent formation of the catalyst/HOPE color complex.

EXAMPLE 6

Repeating Example 5 except that the 0.1 gram phosphoric acid was replaced by 0.1 gram distearyl pentaerythritol diphosphate provided a CDM b+ color value of 9.9. This example shows that the distearyl pentaerythritol diphosphate alone did not prevent formation of the yellow color complex.

EXAMPLE 7

Repeating Example 6 except that the amount of distearyl pentaerythritol diphosphite is increased to 0.25 grams and 0.1 gram poly(ethylene hydrogen phosphate) is also added provided a CDM b+ color value of 6.3. This example shows that the addition of a monohydrogen phosphate compound to the phosphite compound provided an unobvious and unexpected color reduction.

EXAMPLE 8

Repeating Example 7 except that the distearyl pentaerythritol diphosphate is deleted provided a CDM b+ color value of 8.0.

Heretofore, polymer color is often unsatsifactory and does not meet the usual commercial specifications when catalyst residues remain in the polymer and ultraviolet stabilizers containing phenol moieties are added to the polymer. The color of such stabilized products varies with the stabilizer and the amount of catalyst residues. The present invention, however, provides a process whereby catalyst residues are deactivated and a processable ultraviolet light stabilized plastic is provided which has excellent clarity and optical properties.

The invention has been described in detail with particular reference to preferred embodiments thereof, but it will be understood that variations and modifications can be effected within the spirit and scope of the invention.

We claim:

1. A process for deactivating polymerization catalyst residues which form color bodies with phenolic stabilizers which comprises contacting polymeric compositions containing said polymerization catalyst residues with at least one member selected from the group consisting of mono- or dihydrogen phosphonate and mono-, di-, or trihydrogen phosphate compounds and at least one member selected from the group consisting of di- and triester phosphonate compounds or a phosphite compound.

2. A process for deactivating polymerization catalyst residues according to claim 1 wherein said phosphite compound is distearyl pentaerythritol diphosphite.

3. A process for deactivating polymerization catalyst residues according to claim 3 wherein said phosphorous compound is phosphoric acid.

4. A process for deactivating polymerization catalyst residues according to claim 2 wherein said phosphorus compound is poly(ethylene hydrogen phosphate).

5. A process for deactivating polymerization catalyst residues which form color bodies with phenolic stabilizers which comprises contacting polymeric compositions containing said polymerization catalyst residues with about 0.01 to about 0.5 weight percent of at least one member selected from the group consisting of mono- or dihydrogen phosphonate and mono-, di-, or trihydrogen phosphate compounds and about 0.05 to about 0.75 weight percent of at least one member selected from the group consisting of di- and triester phosphonate compounds or a phosphite compound.

6. A process for deactivating polymerization catalyst residues according to claim 5 wherein said phosphite compound is distearyl pentaerythritol diphosphite.

7. A process for deactivating polymerization catalyst residues according to claim 6 wherein said phosphorous compound is phosphoric acid.

8. A process for deactivating polymerization catalyst residues according to claim 7 wherein said phosphorous compound is poly(ethylene hydrogen phosphate).

* * * * *

UNITED STATES PATENT OFFICE
CERTIFICATE OF CORRECTION

Patent No. 4,401,804                    Dated August 30, 1983

Inventor(s)   Paul A. Aristoff

It is certified that error appears in the above-identified patent and that said Letters Patent are hereby corrected as shown below:

Column 4, line 31, "$Z_3$" should read -- Z --.

Column 4, line 33, "$Z_3$" should read -- Z --.

Column 4, line 35, "$Z_3$" should read -- Z --.

Column 4, line 37, "$Z_3$" should read -- Z --.

Column 4, line 39, "$Z_3R$" should read -- ZR --.

Column 4, line 41, "$Z_3R$" should read -- ZR --.

Column 5, lines 29-30, "phenyl)-b20-nor" should read -- phenyl)-20-nor --.

Column 16, line 54, "C=C" should read -- C≡C --.

Column 18, line 50, "pH" should read -- Ph --.

Column 21, line 4, "$BrCH_2(CH_2)_2$-" should read -- $BrCH_2(CH_2)_s$- --.

Column 22, lines 62-63, "C-15 alcohol derivatives are oxidized to the corresponding C-15 ketone" should read -- C-15 ketone --.

Column 42, Claim 1, line 26, ",enzamidophenyl" should read -- benzamidophenyl --.

UNITED STATES PATENT OFFICE
CERTIFICATE OF CORRECTION

Patent No. 4,401,804　　　　　　　　Dated　　August 30, 1983

Inventor(s) Paul A. Aristoff

It is certified that error appears in the above-identified patent and that said Letters Patent are hereby corrected as shown below:

Column 43, misplaced (6) at end of line 14 should appear as follows:

$$(6)\ -\overset{\overset{O}{\|}}{C}-CH_3;$$

Column 44, lines 46-47, should appear as follows:

$$-\underset{\underset{CH_3}{|}}{CH}-CH_2C\equiv CCH_3$$

Signed and Sealed this

Eleventh　Day of February 1986

[SEAL]

Attest:

DONALD J. QUIGG

Attesting Officer　　Commissioner of Patents and Trademarks